US011439896B2

(12) United States Patent
Fountaine

(10) Patent No.: US 11,439,896 B2
(45) Date of Patent: Sep. 13, 2022

(54) MENTAL AND PHYSICAL CHALLENGE THROUGH RECALLING AND INPUTTING A SEQUENCE OF TOUCH INPUTS AND/OR SOUND INPUTS

(71) Applicant: Dennis Fountaine, San Diego, CA (US)

(72) Inventor: Dennis Fountaine, San Diego, CA (US)

( * ) Notice: Subject to any disclaimer, the term of this patent is extended or adjusted under 35 U.S.C. 154(b) by 28 days.

(21) Appl. No.: 16/404,754

(22) Filed: May 7, 2019

(65) Prior Publication Data
US 2020/0353348 A1     Nov. 12, 2020

(51) Int. Cl.
| | | |
|---|---|---|
| *A63F 13/212* | (2014.01) | |
| *A63F 13/46* | (2014.01) | |
| *G06F 3/01* | (2006.01) | |
| *G06F 3/16* | (2006.01) | |
| *G10L 15/08* | (2006.01) | |

(52) U.S. Cl.
CPC ............ *A63F 13/212* (2014.09); *A63F 13/46* (2014.09); *G06F 3/011* (2013.01); *G06F 3/167* (2013.01); *G10L 15/08* (2013.01); *A63F 2300/1081* (2013.01); *G10L 2015/088* (2013.01)

(58) Field of Classification Search
CPC ..................... A63F 13/212; A63F 13/46; A63F 2300/1081; G06F 3/011; G06F 3/167; G10L 15/08; G10L 2015/088
See application file for complete search history.

(56) References Cited

U.S. PATENT DOCUMENTS

| | | | | |
|---|---|---|---|---|
| 6,252,153 B1* | 6/2001 | Toyama | ............... | G10H 1/0008 84/634 |
| 6,337,433 B1* | 1/2002 | Nishimoto | .............. | A63J 17/00 84/464 A |
| 6,450,888 B1* | 9/2002 | Takase | .................... | A63F 13/10 463/43 |
| 8,449,360 B2* | 5/2013 | Stoddard | ............... | A63F 13/814 463/7 |

(Continued)

OTHER PUBLICATIONS

Rock Band 3 Game Manual, 2010, Harmonix Music Systems, Inc. (Year: 2010).*

(Continued)

*Primary Examiner* — Werner G Garner
(74) *Attorney, Agent, or Firm* — Peter Jensen-Haxel

(57) ABSTRACT

Disclosed are a method, a device, a system, and/or a manufacture of a mental and physical challenge through recalling and inputting a sequence of touch inputs and/or sound inputs. In one embodiment, a device for engaging a user in a mental and/or physical challenge includes a platform capable of laying substantially flat on a surface, two or more touch sensors attached to the platform for receiving a touch input from the user, two or more visual indicators of the platform, a speaker for providing a sound indicator, and a microphone for receiving a sound input from the user. A computer memory includes a sequence data specifying a set of inputs, a sequence indication routine for generating an input indication of the sequence data, and a comparison routine for comparing the sequence data to the input data to provide a score and/or a rank. The challenge may be set to music.

11 Claims, 7 Drawing Sheets

(56) References Cited

U.S. PATENT DOCUMENTS

| | | | | |
|---|---|---|---|---|
| 8,901,405 B1* | 12/2014 | McCarthy | ............ | G09B 15/023 |
| | | | | 84/478 |
| 2003/0066414 A1* | 4/2003 | Jameson | ................ | G10H 3/125 |
| | | | | 84/741 |
| 2009/0258686 A1* | 10/2009 | McCauley | ............ | A63F 13/245 |
| | | | | 463/7 |
| 2011/0009191 A1* | 1/2011 | Naidenov | ............. | A63F 13/814 |
| | | | | 463/35 |
| 2018/0137425 A1* | 5/2018 | D'Alo' | .................... | G06N 5/04 |

OTHER PUBLICATIONS

Kombo, Rock Band 3 Corrects Pitch in Real Time, Makes You Hate Yourself Less at Parties, May 4, 2012, Gamezone.com, available at <<https://www.gamezone.com/originals/rock-band-3-corrects-pitch-in-real-time-makes-you-hate-yourself-less-at-parties/>>. (Year: 2012).*
Konami, Dance Dance Revolution operator's manual, Original Video Game, https://www.manualslib.com/manual/1756526/Konami-Dance-Dance-Revolution.html.
MB Games, Bop it! 07789, https://www.hasbro.com/common/documents/87e9fbe8d56fe1124784f6d2788f8ce8/421AEB0819B9F36910B5745D91F913BF.pdf.

* cited by examiner

*FIG. 4*  CHALLENGE PROCESS FLOW 450

FIG. 5  INPUT EVALUATION PROCESS FLOW 550

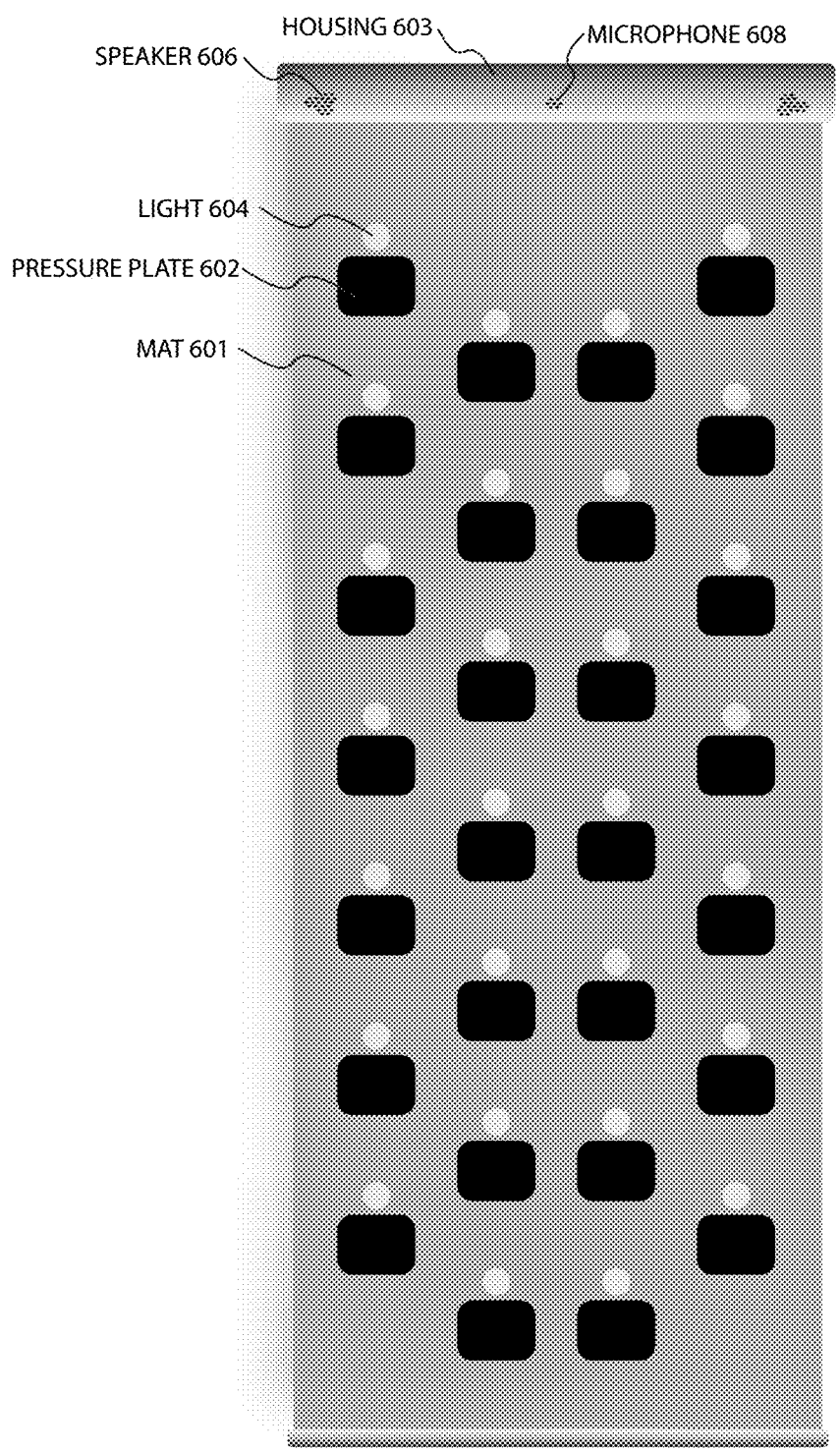
FIG. 6

MENTAL AND PHYSICAL CHALLENGE THROUGH RECALLING AND INPUTTING A SEQUENCE OF TOUCH INPUTS AND/OR SOUND INPUTS

FIELD OF TECHNOLOGY

This disclosure relates generally to data processing devices and, more particularly, to a method, a device, a system and/or a manufacture of mental and physical challenge through recalling and inputting a sequence of touch inputs and/or sound inputs.

BACKGROUND

A number of types of games may challenge mental ability of a player (e.g., a user of the game). The mental ability may be, for example, memory, alertness, and/or creativity. A mental game may require the user recalling a sequence from the user's biological memory. Real-time sequence games may require that the player to perceive and respond to (e.g., copy) a real-time sequence. Games challenging the mental ability may be substantially fun and rewarding for the player. The mental game may be a board game or may be effected by and/or augmented by one or more devices and/or systems (e.g., mechanical, electrical, and/or digital).

Some games may also challenge a physical ability of the player. A physical ability may be, for example, a dexterity, a reflex, a motor skill, a flexibility, and/or a verbal skill such as articulation. For example, some games may be played by the player copying a real-time sequence by pressing on game controller buttons with fingers, or even larger input devices with hands and/or feet. Other games may challenge the player to contort themselves into to a certain challenging configuration. Games challenging the physical ability may also be substantially fun and rewarding for the player. The physical game may be a board game or may be effected by and/or augmented by one or more devices and/or systems (e.g., mechanical, electrical, and/or digital).

There is a need for continued innovation in games to provide new experiences and challenges, including cooperative and/or competitive challenges. There may be a substantially fun and rewarding game experience where a gaming device and/or system can simultaneously challenge the mental ability and the physical ability of one or more players.

SUMMARY

Disclosed are a method, a device, a system, and/or a manufacture of mental and physical challenge through recalling and inputting a sequence of touch inputs and/or sound inputs.

In one embodiment, a device for engaging a user in a mental and/or physical challenge includes a platform capable of laying substantially flat on a surface, two or more touch sensors attached to the platform for receiving a touch input from the user, and two or more visual indicators at least one of attached to and attachable to the platform. At least one of the two or more visual indicators are associated with at least one of the two or more touch sensors. The device includes a processor and a computer memory. The computer memory includes a sequence data comprising data specifying at least one of an order of an input, a timing of the input, and a duration of the input.

The memory also includes a sequence indication routine that can include computer readable instructions that when executed on the processor generates an input indication of at least a portion of the sequence data to the user on at least one of the two or more visual indicators. The device also has a sequence initiation routine comprising computer readable instructions that when executed on the processor generates an input data. The input data includes a touch input data received from one or more of the two or more touch sensors. The memory also stores a comparison routine comprising computer readable instructions that when executed on the processor compares the sequence data to the input data to determines a match. A termination condition includes data specifying one or more conditions under which the comparison routine terminates.

At least one of the two or more visual indicators are at least one of a light at least one of within at least one of the two or more touch sensors and proximately associated with at least one of the two or more touch sensors. The computer memory further may include computer readable instructions that when executed on the processor illuminates the light to communicate the order, the timing, and/or the duration of the input. The device may further include a speaker, and the computer memory further comprising computer readable instructions that when executed on the processor generates a sound on the speaker communicating at least one of the order, the timing, and the duration.

The device may include a microphone and the sequence initiation routine may further include computer readable instructions that when executed on the processor generates the input data that further includes a sound input data received from the microphone. The sequence initiation routine may further include computer readable instructions that when executed on the processor generates a visual indication of the touch input and generates a sound indication of a sound input.

The sequence initiation routine may also include computer readable instructions that when executed on the processor generates a sound indication of the touch input; and generate a visual indication of a sound input.

The device may include a display. The visual indication of the touch input may be presented on the display. At least one of the two or more visual indicators may be an alphanumeric label, one or more symbols, a shape, a color, a logo, and/or a display (e.g., an LCD screen display). At least one of the two or more touch sensors includes at least one of a near-field communication sensor, an RFID sensor, a pressure sensor, a resistive sensor, a capacitive sensor, a surface acoustical wave sensor, and an infrared sensor. The sequence data may be receivable over a network interface controller. At least one of the two or more visual indicators may be detachably associated with the at least one of the two or more touch sensors on the platform. The input data may be associated with a score based on at least one of the order of the input, the timing of the input, and/or the duration of the input.

The device may include a network interface controller, along with a sequence creation routine comprising computer readable instructions that when executed on the processor records a user sequence data that is an instance of the sequence data based on the input data of the user. A share module for uploading the user sequence data to at least one of a server computer and a computing device of a different user.

In another embodiment, a system for engaging a user in a mental and/or physical challenge includes an input platform and a mobile device. The input platform includes a platform, two or more touch sensors attached to the platform for receiving a touch input from the user and two or more visual indicators attached to and/or attachable to the platform. At least one of the two or more visual indicators are associated with at least one of the two or more touch sensors. The platform further includes a processor of the input platform, a computer memory of the input platform, and a network interface controller of the input platform.

The mobile device includes a display, a processor of the mobile device, and a computer memory of the mobile device, comprising. The computer memory of the mobile device stores a sequence data comprising data specifying at least one of an order of an input, a timing of the input, and a duration of the input. A sequence indication routine includes computer readable instructions that when executed on the processor of the mobile device generates an input indication of at least a portion of the sequence data on the display of the mobile device and/or transmits a sequence indication data to the input platform to generate the input indication to the user on at least one of the two or more visual indicators of the input platform. The computing memory may store a sequence initiation routine that includes computer readable instructions that when executed on the processor generates an input data that includes a touch input data received from one or more of the two or more touch sensors of the input platform. A comparison routine includes computer readable instructions that when executed on the processor compares the sequence data to the input data to determine a match. The computing memory of the mobile device includes a termination condition comprising data specifying one or more conditions under which the comparison routine terminates. The system may further comprise a voice controlled device, a challenge server, a voice server, and/or a proximity beacon of the user that may be utilized to interact with the input platform.

In yet another embodiment, a system includes an input platform, a voice controlled device, and a network. The input platform includes a platform, two or more touch sensors attached to the platform for receiving a touch input from the user, and two or more visual indicators at least one of attached to and attachable to the platform, at least one of the two or more visual indicators associated with at least one of the two or more touch sensors. The input platform also includes a processor of the input platform, a computer memory of the input platform, and a network interface controller of the input platform.

The system includes a voice controlled device having a speaker, a microphone, a processor of the voice controlled device, and a computer memory of the voice controlled device. The computer memory of the voice controlled device stores a voice application, the voice application including a sequence data comprising data specifying at least one of an order of an input, a timing of the input, and a duration of the input. The voice application also includes a sequence indication routine comprising computer readable instructions that when executed on the processor of the voice controlled device generates an input indication of at least a portion of the sequence data on the speaker of the voice controlled device and transmits a sequence indication data to the input platform to generate the input indication to the user on at least one of the two or more visual indicators of the input platform. The voice application further includes a sequence initiation routine comprising computer readable instructions that when executed on the processor generates an input data comprising a touch input data received from one or more of the two or more touch sensors of the input platform. A comparison routine included in the voice application comprises computer readable instructions that when executed on the processor compares the sequence data to the input data to determine a match. A stored termination condition includes data specifying one or more conditions under which the comparison routine terminates. The system may further comprise a mobile device, a challenge server, a voice server, and/or a proximity beacon of the user that may be utilized to interact with the input platform.

Additional aspects of this embodiment that may be included are shown in the figures and described in the accompanying text.

BRIEF DESCRIPTION OF THE DRAWINGS

The embodiments of this disclosure are illustrated by way of example and not limitation in the figures of the accompanying drawings, in which like references indicate similar elements and in which:

FIG. 6 illustrates an embodiment of the input platform comprising a mat, a housing including a speaker and a microphone, instances of a light as the visual indicator, and instances of a pressure plate as the touch sensor, according to one or more embodiments.

Other features of the present embodiments will be apparent from the accompanying drawings and from the detailed description that follows.

DETAILED DESCRIPTION

Disclosed are a method, a device, a system and/or a manufacture of mental and physical challenge evaluating touch inputs on an input platform and/or sound inputs on a sound controlled device. Although the present embodiments have been described with reference to specific example embodiments, it will be evident that various modifications and changes may be made to these embodiments without departing from the broader spirit and scope of the various embodiments.

Figure 1:
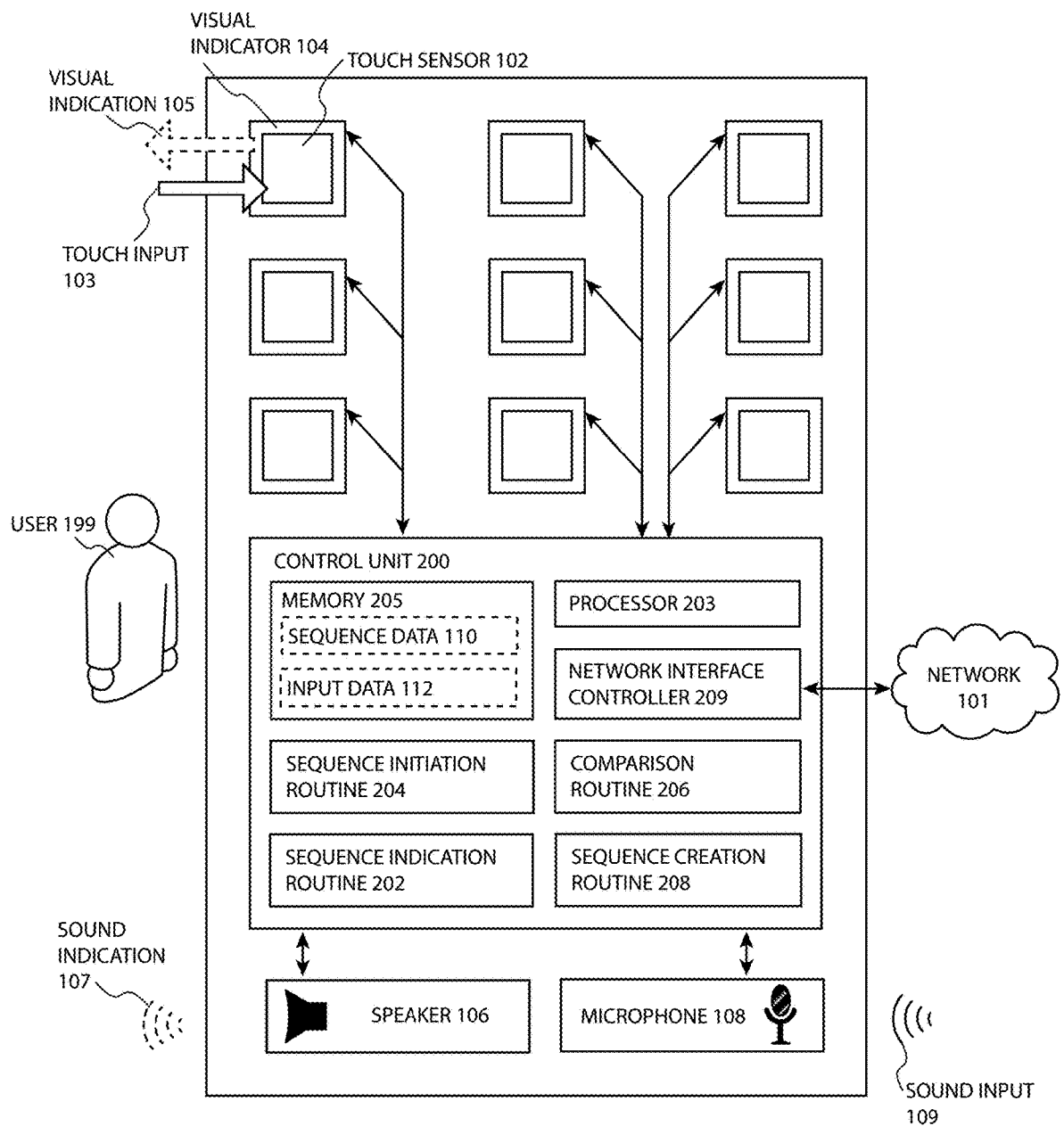
FIG. 1 illustrates an input platform for engaging a user in a mental and/or physical challenge in which the user receives a sequence of visual indications from visual indicators and/or sound indications from a speaker and recalls the sequence by entering touch inputs and/or sound inputs to generate an input data which may then be assessed for a score and/or a rank by a comparison routine, according to one or more embodiments.

FIG. 1 illustrates an input platform 100 for engaging a user 199 in a mental and/or physical challenge (which may be a game) in which the user 199 receives a sequence of one or more instances of a visual indication 105 from one or more instances of a visual indicator 104 and/or one or more instances of a sound indication 107 from one or more instances of a speaker 106 and enters one or more instances of a touch input 103 and/or one or more instances of a sound input 109 communicated to a control unit 200 to generate an input data 112 which may then be assessed for a score and/or a rank by a comparison routine 206 of the control unit 200.

The input platform 100, for example, can be utilized to test one or more instances of the user 199 in a memory and/or physical challenge game in which a sequence specified in the sequence data 110 can be presented to one or more instance of the user 199 in one or more parts to provide a challenge to the biological memory, the reflexes, the dexterity, and/or the physical flexibility. While one or more users 199 may utilize the input platform 100, interactions of the one or more users 199 will generally be referred to as "the user 199" herein. Specific examples of multi-user challenges are described throughout the present embodiments, including following the description of FIG. 6, below.

The sequence may involve a sequence of instances of the touch input 103 and/or instances of the sound input 109 specified in the sequence data 110. The sequence may alternate between the touch input 103 and the sound input 109. The touch input 103, for example, may be a pattern in which the two or more touch sensors 102 must be activated (e.g., pressed) by the user 199 in a series and/or simultaneously. Similarly, the sound input 109, for example, may be a sound (that may include a sound effect, a word, phrase, or sentence) the user 199 is to make according to a timing. Instances of the touch input 103 and the sound input 109 may alternate and/or may be interwoven within the sequence. The sequence is specified in a sequence data 110, as shown and described in detail in conjunction with the embodiment of FIG. 2.

The sequence is indicated to the user 199 through a visual indication 105 and/or a sound indication 107. The visual indication 105 may be provided by a visual indicator 104 that may be static (e.g., a symbol, logo, and/or graphic on the input platform 100 associated with the visual indicator 104) and/or dynamic (e.g., an LED light, a visualization on an LCD screen). Depending on the sequence data, the visual indication 105 may communicate to the user 199 a corresponding instance of the touch input 103 that should be activated and/or that an instance of the sound input 109 should be generated by the user 199.

In a specific example, the input platform 100 may comprise several instances of the touch sensor 102 each surrounded by a set of LED lights as an instance of the visual indicator 104. The user 199 may be presented by the sequence when initiated, as shown and described below. A pattern and timing of the sequence data 110 may be presented by flashing each set of the LED lights. The user 199 may then be challenged to provide a set of touch inputs 103 to match the sequence, the timing of the sequence, and/or other aspects of the sequence. The input generated by the user 199 may be communicated to the control unit 200 and is stored as the input data 112. The input data 112 may be scored and/or ranked (e.g., by comparison routine 206) based on an accuracy, a duration, and a timing compared to presentation of the sequence and/or other factors.

In a specific example, the input platform 100 includes 12 images of prehistoric animals (e.g., dinosaurs) as instances of the visual indication 105 on one or more LCD screen(s), each which may have an associated touch sensor 102 (which may be a specified section of the LCD screen sensitive to the user 199 as a touch sensor 102). The sequence data 110 may include data specifying several geological time periods. The user 199 may be presented with the sequence when initiated, as shown and described below. In this specific example, where the platform 100 flashes a prehistoric animal as the visual indication 105, the user 199 must speak the name of the animal. Where the sound indication 107 speaks a geologic time period, the user 199 must select one or more animals with a corresponding instance of the touch sensor 102 for the animal that lived and/or predominated in the geological time period. For example, the sequence may be presented as: tyrannosaurus (presented as a first instance of the visual indication 105), Pliocene (presented as a first instance of the sound input 109), triceratops (presented as a second instance of the visual indication 105), sabretooth tiger (presented as a third instance of the visual indication 105), and Permian (presented as a second instance of the sound input 109). The user 199 would then recall the sequence and enter the "correct" inputs by: speaking "tyrannosaurus" (e.g., as a first instance of the sound input 109), selecting a giant ground sloth (as a first instance of the touch input 109 with a visual indicator 105 of ground sloth), speaking "triceratops" (e.g., as a second instance of the sound input 109), speak "sabretooth tiger" (e.g., as a third instance of the sound input 109), and select a Diplocaulus (as a second instance of the touch input 109 with a visual indicator 105 of a Diplocaulus). The input generated by the user 199 may be communicated to the control unit 200 and is stored as the input data 112.

The input data 112 may be scored based on a timing compared to presentation of the sequence, an accuracy of the sequence, a speed, and/or other factors which may be shown and described herein. The challenge may be varied by varying timing, requiring two or more inputs simultaneously (e.g., one touch input 103 at the same time as a sound input 109), mixing unrelated content (e.g., military vehicles with nebula shapes) and through many other methods. The presentation of the sequence data 110 and/or the input may be set to music (e.g., the music file 236 of FIG. 2). In one or more embodiments, a first user 199 may also generate a sequence data and transmit it to a second user 199 to create a social challenge with user-generated content transmitted and/or shared between or among multiple instances of the user 199, as shown and described below.

In one or more embodiments, the visual indicators 104 may be attached to the input platform 100. In one or more embodiments, the visual indicators 104 may be attachable/detachable from the input platform 100, for example by use of hook-and-loop attachment (e.g., Velcro®). The visual indicators 104 may be a light (e.g., an electronic light) proximately associated with a touch sensor 103. The visual indicators 104 may be an alphanumeric label, one or more symbols, a shape, a color, a logo, and a display (e.g., an LCD display capable of presenting the alphanumeric label, the one or more symbols, the shape, the color, and/or the logo).

The touch sensor 102 may be one or more sensors that can detect a touch and/or a close proximity of an object and/or the user 199 (e.g., an inch, three millimeters). The touch sensor 102 may be integrated into an LCD screen or other type of display screen that is touch-sensitive. The touch sensor 102 may be, for example, based on a near-field communication sensor, an RFID sensor, a pressure sensor, a resistive sensor, a capacitive sensor, a surface acoustical wave sensor, and/or an infrared sensor. Each touch sensor 102 is communicatively coupled to the control unit 200 which receives the touch input 103 of the user 199.

The sound indication 107 is generated by a speaker 106. The sound indication 107 may be a sound effect, a tone, a music, a sound effect, a word, phrase, and/or one or more sentences. The speaker 106 is communicatively coupled to the control unit 200.

The microphone 108 receives a sound input 109 of the user 199. The sound input 109 may be a word, a note and/or a music (e.g., played on a music instrument of the user 199 such as a violin or a xylophone), a sound effect (e.g., an animal imitation that may be generated by the user 199), a word, a phrase, and one or more sentences (e.g., the user 199 reciting a line and/or an entire poem). The microphone is communicatively coupled to the control unit 200.

The control unit 200 may comprise a processor 203, a memory 205, a sequence indication routine 202, a sequence initiation routine 204, a comparison routine 206, and a sequence initiation routine 208. The memory 205 may store the sequence data 110 and the input data 112. The control unit 200 is shown and described in detail in conjunction with FIG. 2. The sequence indication routine 202 may comprise computer readable instructions that when executed on the processor 203 may trigger and/or initiate a sequence indicator (e.g., instances of the visual indicator 104 and/or the sound indication 107) to present to the user 199. The sequence initiation routine 204 may comprise computer readable instructions that when executed on the processor 203 may receive and store the inputs of the user 199 (e.g., instances of the touch input 103 and/or the sound input 109). A comparison routine 206 may comprise computer readable instructions that when executed on the processor 203 compares the input data 112 to the sequence data 110 and determines a score and/or a rank based on one or more factors such as accuracy, timing, etc. The score may be a number, a letter grade, a percentage, etc. The sequence creation routine 208 may comprise computer readable instructions that receives inputs of the user 199 (which may be instances of the touch input 103 and/or the sound input 109) and generates an instance of the sequence data 110 that may be referred to as a user sequence data. The user sequence data may be a user-generated content. The user 199 may record the user sequence data on the input platform 100, through the voice controlled device 320, and/or through the mobile device 380, as shown and described in FIG. 3.

The input platform 100 may be connected to a network 101 with a network interface controller 209. The network 101 may be a local area network (LAN), a wide area network (WAN), the Internet, etc. Connection through the network 101 may permit the user 199 to download instances of the sequence data 110 (e.g., from a server computer, a shown and described in FIG. 3) and/or share the user sequence data to challenge other users 199.

Figure 2:
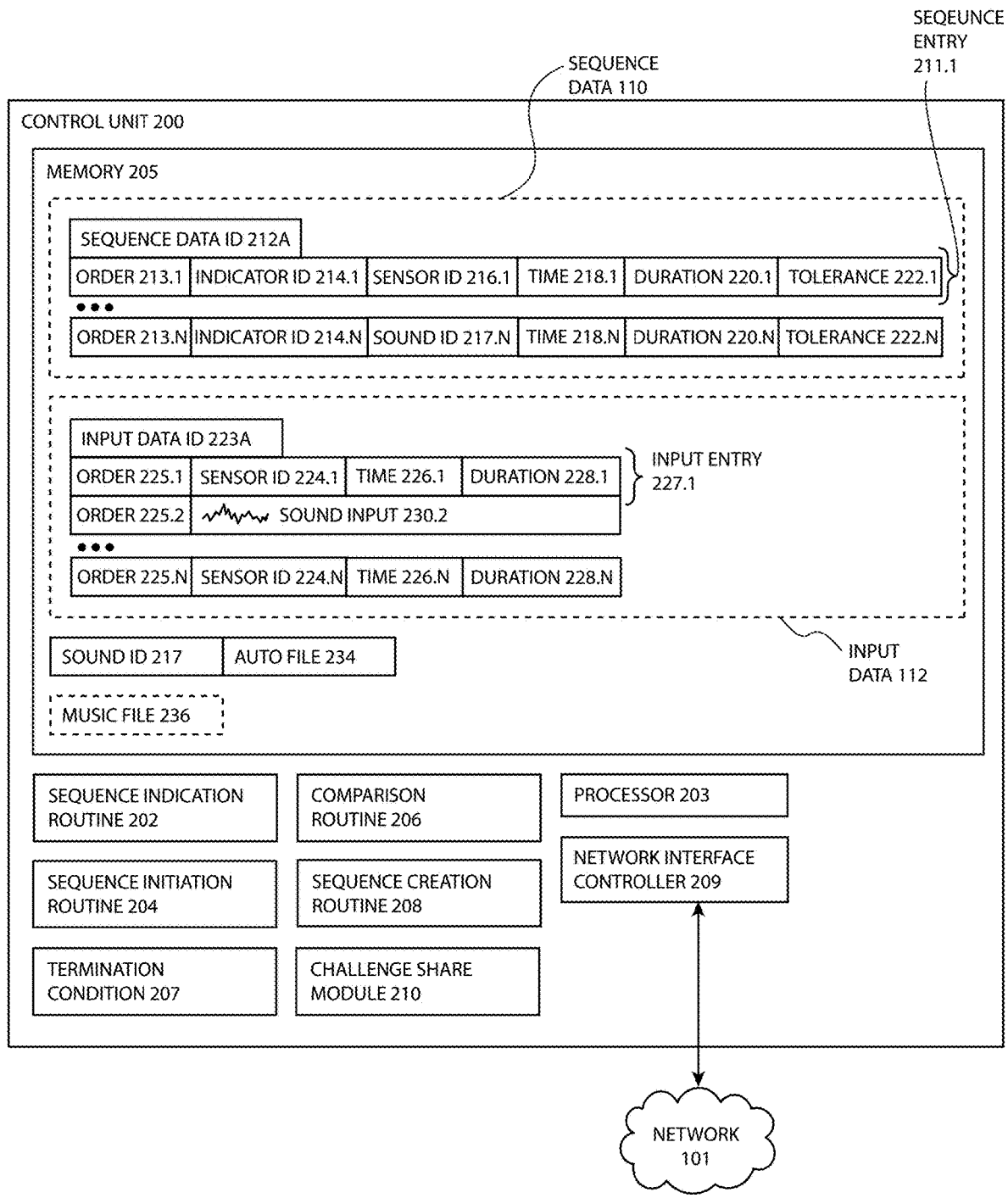
FIG. 2 illustrates a control unit comprising hardware and computer readable instructions stored in a memory which may control and communicate with the touch sensors, visual indicators, microphones, speakers, and additional components of the input platform of FIG. 1, according to one or more embodiments.

FIG. 2 illustrates a control unit comprising hardware and computer readable instructions stored in a memory which may control and communicate with the touch sensors, visual indicators, microphones, speakers, and additional components of the input platform FIG. 1, according to one or more embodiments. The control unit 200 comprises the memory 205 and a processor 203 that is able to execute computer readable instructions to communicate with the various sensors (e.g., the touch sensor 102, the microphone 108) and input indicators (e.g., the visual indicator 104, the speaker 106). The processor 203 is a computer processor capable of operation on data and executing computer readable instructions, and the memory 205 is a computer memory capable of storing data and computer readable instructions (e.g., RAM, a solid state drive, a memrister, a disk). In one or more embodiments, as shown and described in conjunction with the embodiment of FIG. 3, the processor 203 and the memory 205 could be included, for example, in a mobile device (e.g., the mobile device 380 of FIG. 3). The processor 203 may also be a custom microcomputer platform, for example Arduino, Picaxe, and/or Raspberry Pi. All of such microcomputer platforms may have the capability to communicate with the speaker 106, the microphone 108, the network 101, and/or other input/output devices of the input platform 100.

The control unit 200 comprises a sequence data 110. The control unit 200 may generate and/or receive (e.g., download) the sequence data 110, which may comprise data specifying a set of inputs that the user 199 may ideally be able to repeat and/or recall as inputs after indication of the sequence to the user 199. However, in one or more embodiments, the sequence data 110 may also include additional data, such as, for example, a sequence that the user 199 must input the opposite of to achieve a high score. For example, the user 199 may be required to remember a sequence presented on the instances of the visual indicator 104 on the input platform 100 and then enter a mirror image of the sequence on the touch sensors 102 based on what may be a symmetry line of the input platform 100.

The sequence data 110 is data stored in a computer memory (e.g., the memory 205) specifying several associated attribute-value pairs forming a sequence entry 211, where each instance of the sequence entry 211 may comprise: an order 213, an indicator ID 214, a sensor ID 216.1, a time 218.1, a duration 220.1, and/or a tolerance 222.1. The sequence data 110 may be identified with a sequence data ID 212 (e.g., a sequence data ID 212A for a first instance of the sequence data 110, a sequence data ID 212B for a second instance of the sequence data 110, etc.). The sequence data may comprise two or instances of the entry 211 (e.g., denoted "0.1" for a first sequence entry 211.1, "0.2" for a second sequence entry 211.2, etc.). The indicator ID 214 specifies an input indicator (e.g., the visual indicator 104, the speaker 106) that should be activated when indicating and/or presenting the sequence data 110 to the user 199. The order 213 is an order of an input to generate a "correct" or maximum score, and be specified as a value that may be a simple number in the sequence (e.g., 0001, 0002) and/or may be a GUID (e.g., a 32 character random alphanumeric string). The sensor ID 216 identifies a sensor the user 199 may provide the input on to be "valid", "correct", and/or receive a high score and/or receive a highest score for that input. In one or more embodiments, a visual indicator 104 of the indicator ID 214 and the touch sensor 102 of the sensor ID 216 are proximately associated on the input platform 100. In one or more other embodiments, as described in the symmetry example above, the touch sensor 102 may not be proximately associated with the visual indicator 104 but a challenge objective known to and/or presented to the user 199 that may provide sufficient information to determine the "correct" touch sensor 102. For example, a correct touch sensor 102 for which the user 199 to provide the touch input 103 is a furthest possible instance of the touch sensor 102 compared to the visual indicator 104 providing the visual indication 105. In one or more embodiments, the sequence data 110 comprises data specifying an order of an input (e.g., utilizing a sequence ID), a timing of the input (e.g., specified in the time 218), and/or a duration of the input (e.g., utilizing the duration 220).

In one or more embodiments, the sequence data 110 may be downloaded, selected, and/or streamed by connecting to a challenge server 340 (as shown and described in detail in conjunction with FIG. 3) via the network 101. In such case, the challenge server 340 may provide the sequence data 110 (e.g., from a database of the challenge data 110 such as the sequence data 342 of FIG. 3). In another embodiment, the sequence creation routine 208 may receive its copy of the sequence data 110 via the network 101 from another user 199 who is using a separate instance of the input platform 100.

In one or more embodiments, a sound file 234 corresponding to a sound (e.g., a word, a sound effect) to be played to the user 199 on the speaker 106 as the sound indication 107 may be stored in the sequence data 110. However, as shown in FIG. 2, the sound ID 217 may reference the audio file 234 that may be stored distinct from the sequence data 110. For example, multiple instances of the sequence data 110 may utilize the same instance of the audio file 234 by referencing the audio file 234 rather than each having to store a copy of the audio file 234.

The time 218 may be a time from the beginning of the sequence, a time relative to a previous instance of the sequence entry 211, a time after a previous input of the user 199, and/or a time relative to a musical note of the music playing. The duration 220 is a duration of time in which the input should be provided by the user 199. For example, where the sensor ID 216 specifies a touch sensor 102, the ideal (e.g., highest scoring) duration of the touch input 103 of the user 100 may be set to a value such as 1 second, at least 2 seconds, between 1.5 and 1.7 seconds, etc. In one or more other embodiments the duration may be longer (e.g., 30 seconds) and the user 199 may be expected to maintain the input while providing other inputs. Although not shown, an indication duration may also be specified (e.g., 5 seconds, 1 second, 100 milliseconds) for a length of time to present an input indicator. For example, it may be a physical challenge for the user to span with his or her body one or more of the touch sensors 102. In another example, a physical challenge may include a verbal challenge such as pronunciation under a time constraint, articulation which may be assessed for accuracy, and/or other physical verbal challenges associated with a "tongue twister." Although not shown in the embodiment of FIG. 2, the sequence entry 211 may also comprise a player ID where two or more players may enter different aspects and/or parts of the sequence. Although not shown in the embodiment of FIG. 2, each instance of the sequence entry 211 may further comprise a sequence ID. The sequence data 110 may include an arbitrary number of instances of the sequence entry 211 (e.g., the sequence entry 211.1 through the sequence entry 211.n).

The sequence ID may be a unique value within the instance of the sequence data 110 which may enable the sequence data 110 to be processed in a defined order by the processor 203. The indicator ID 214 specifies that one or more instances of a visual indicator 104 that will be displayed or lighted for that particular sequence of the challenge administered to the user 199. The sensor ID 216 specifies which sensor is required for the touch input 103 and/or sound input 109 to be "correct" and/or achieve a high score. For example, the sensor ID 216.1 may specify a specific instance of the touch sensor 102 and/or a specific instance of the microphone 109, and/or other types of sensors. The tolerance 222 will later be used by the comparison routine 206, as shown and described below, to determine if the user 199 entered the "correct" input within a predetermined variance. For example, the tolerance 222 may specify the user 199 may exceed the duration by up to 5%, may be off in timing by 500 milliseconds, or may be able to enter the touch input 103 at an instance of the touch sensor 102 adjacent to the "intended" instance of the touch sensor 102 identified in the sensor ID 216 without the challenge terminating and/or a reduction in score.

In a specific example, The sequence entry 211 of the sequence data 110 may specify an instance of the visual indicator 104 to illuminate using a value stored in the indicator ID 214 attribute (e.g. a top left LED), the instance of the sensor which is the "correct" sensor to receive the input of the user 199 using the value stored in the sensor ID 216 attribute (e.g. the touch sensor 102 directly below the top left LED), a time from an initiation of the sequence data 110 in which receipt an input by the user 199 is required for the challenge to continue and/or to achieve a high score. The tolerance 222 may be used, for example by the comparison routine 206, to determine whether the user 199 entered the sensor input in an optimal and/or permissible amount of time, provided sensor input in the optimal duration and/or permissible duration, etc., which may be used to determine the score and/or rank of the user 199. In one or more embodiments, the user 199 may set a difficulty before engaging in the challenge which may affect and/or modify the tolerance 222 of one or more instances of the sequence entry 211 of the sequence data 110.

The input data 112 is data stored in a computer memory (e.g., the memory 205) specifying several associated attribute-value pairs forming an input entry 227, where each instance of the input entry 227 may comprise: an order 221, an input ID 223, a sensor ID 224, a time 226, a duration 228, and, and/or a sound input 230. The sound input 230 may be stored as a sound file in sequence. However, in one or more embodiments the sound input 230 may also be captured as a single set of data and overplayed and/or assessed in conjunction with each instance of the input entry 227 specifying non-sound sensors (e.g., the touch sensor 102). In one or more embodiments, each instance of the input entry 227 may be data that was captured from interactions with the user 199 by the input platform 100 during a challenge (e.g., a challenge game). The input data 112 may comprise several or many instances of the sequence entry 211, with more instances of the input entry 227 representing a greater amount of input from the user 199.

In one or more embodiments, the sensor ID 224 attribute specifies the location of a specific sensor, which may be a touch sensor 102 activated and/or pressed by the user 199, the microphone 108 on which the sound input 109 was received. The time 226 stores the time the user 199 interacted with the specific sensor. In one or more embodiments, a time stamp is generated by computer readable instructions produced by an internal clock function of the processor 203. The duration 228 stores a length of time the user 199 interacted with the sensor, e.g. how long the user 199 pressed and held a touch sensor 102 and/or the length of a recorded sound input 230.1. The sound input 230 may contain data of a sound generated by the user 199 (e.g., as received by microphone 108, recorded by the control unit 200, and stored in the memory 205).

In a specific example, the input data 112 may comprise several or many instances of the input entry 227 that describe a sequence of inputs provided by the user 199. If, for example, the user 199 pressed the top left instance of the touch sensor 102 two times, there may be two instances of the input entry 227 of data stored in the input data 112 (e.g., an input entry 227.1 and an input entry 227.2, etc.). The data in the first the input entry 227.1 will contain a sensor ID 224.1 value which may indicate that the top left sensor was touched, a time stamp value 226.1 provided by the processor 203 which specifies a time the touch input 103 was generated, and a duration 228.1 that indicates an amount of time of the touch input 103 (e.g., how long a pressure plate was depressed by the hand or foot of the user 199). In this example, the second entry 227.2 may contain similar values: a value of the sensor ID 224.2 may be the same as the value of the sensor ID 224.1 and a value of the time stamp value 226.2 may be different because the second instance of the touch input 103 took place later than the first instance of the touch input 103. A value of the duration 228.2 may be the same or different than the previous duration value depending upon how long the user 199 pressed the touch sensor 102 during the second instance of the touch input 103. In the specific example, no sound data has been stored in association with an input entry 227, for example because the user 199 did not yet produce any sounds and/or a sound input 109 was not implicated in the sequence data 110.

In one or more embodiments, the sequence data 110 may be structured to correspond to the rhythm of a music file 236. This may provide a "timing" that the user 199 may follow and/or may aid the user 199 in providing the inputs in the "correct" sequence, time, duration, and/or other scoring metrics. For example, a music file 236 that contained a drum playing at one beat per second might require the user 199 to generally provide inputs according to the beat. In another embodiment, the user may press a specific touch sensor 102 labeled with an icon of a drum at the same rate of one beat each second. If the music file 236 switches, for example, from two drum beats to three cymbal crashes, the user 199 may be expected to press various corresponding instances of the touch sensors 102 that have icons of drums and cymbals. The sequence data 110 will previously have been set up to match the durations and instruments that are present in the music file 236.

In one or more other embodiments, the music 236 may be a complex sic with instruments and may be provided regardless of a musical association with the visual indicator 104, For example the music 236 may be a pop music, an orchestrated/music, a hip hop music, an electronical music, etc.

The control unit 200 may also comprise a processor 203, a network interface controller 209, a sequence indication routine 202, a sequence initiation routine 204, a comparison routine 206, a sequence creation routine 208, a termination condition 209, and a challenge share module 210. In one or more embodiments the music may have an impact on rules of the challenge. For example, where a first music plays, the user must recall the inputs exactly. Where a second music plays, the user must do the opposite of the recalled sequence.

The sequence indication routine 202 may comprise computer readable instructions that when executed on a processor (e.g., the processor 203) indicates the sequence of the sequence data 110 to the user 199. In one or more embodiments, the sequence indication routine 202 includes computer readable instructions that when executed on a processor (e.g., the processor 203) generates an input indication (e.g., a visual indication 105) of at least a portion of the sequence data 110 (e.g., an sequence entry 211.1 through an sequence entry 211.15) to the user 199 on at least one of the two or more instances of the visual indicator 104. The sequence indication routine 202 may cycle through each instance of the sequence entry 211 according to the order number of the sequence data 110 and activate each input indicator associated with each indicator ID of each instance of the sequence entry 211 (e.g., light up a specified instance of the visual indicator 104 and/or activate the sound file 234 to provide a sound indication 107). Such an indication process may continue until each sequence entry 211 of the sequence data 110 has been processed and presented to the user 199 as a visual indication 104 and/or a sound indication 107. Following the sequence indication routine 202, the user 199 may then recall one or more aspects of the sequence data 110 by providing input via the touch sensor 102 and/or the microphone 108.

The sequence initiation routine 204 may include computer readable instructions that when executed on a processor (e.g., the processor 203) generates the input data 112. For example, the sequence initiation routine 204 may receive a start input from the user 199, may reserve one or more memory addresses of the computer for the input data 112, assign an identifier (e.g., the input data ID 223) to the input data 112, and/or activate an agent to receive data on one or more channels from one or more sensors (e.g., the microphone 108, the touch sensor 102). As each input is received by the input platform 100, corresponding data may be stored in memory 205 as the input data 112.

The comparison routine 206 comprises computer readable instructions that that when executed on a processor (e.g., the processor 203) compares the sequence data 110 to the input data 112 to determine a match. The match may be, for example, the user 199 a sensor identified by sensor ID 216 within the tolerance 222, at the time 218 within the tolerance 222, and at the duration 220 within the tolerance 222. The comparison routine 206 may evaluate the input data 112 in real time (e.g., as the user 199 enters each input) or may wait until the user 199 completes attempting to recall the entire sequence data 110. The comparison routine 206 may provide a score/rank to the user 199 and/or may transmit a result to a server computer for scoring and/or ranking.

Where an input is incorrect (e.g., outside the tolerance 222 and/or outside a threshold value of the tolerance 222 where the tolerance 222 may specify several values), repeatedly incorrect, too slow, etc., the sequence initiation routine 204 may terminate. As each input is received, a check may be made against a termination condition 207. In one or more embodiments, the termination condition 207 includes data specifying one or more conditions under which the sequence initiation routine 202 terminates. For example, as each input is received by the processor 203, it may be checked against the termination condition 207 to determine if input collection terminates and operationally if a message generated to inform the user 199 of termination.

For example, the termination condition 207 may be that the user 199 waited too long between providing inputs to the input platform 100, provided more inputs than are contained in the sequence data 110, the input may be off beat from the music, and/or provided improper inputs (e.g. a sound input was expected but a touch input was received instead). Once the termination condition 207 is met, the memory challenge ends.

As an example, if the sequence data 110 prompted the user 199 to touch a top left touch sensor for 1 second, wait 2 seconds, the top middle touch sensor for 3 seconds, wait 4 seconds, then the top right sensor touch for 4 seconds, then the comparison routine 206 may compare each of those ideal inputs in the sequence data 110 against the corresponding data stored in the input data 112. Any variances between the sequence data 110 and the input data 112 may be scored by the comparison routine 206.

The sequence creation routine 208 may comprise computer readable instructions that when executed on a computer processor (e.g., the processor 203) receives inputs from the user 199 to define and/or create their own instance of the sequence data 110 referred to as the user sequence data. In one or more embodiments, the sequence creation routine 208 can randomly generate sequences based on lookup tables stored in the memory 205. This could, for example, randomly select values of the attributes of or more entries 211 according to predefined parameters and/or automatic processes.

Figure 3:
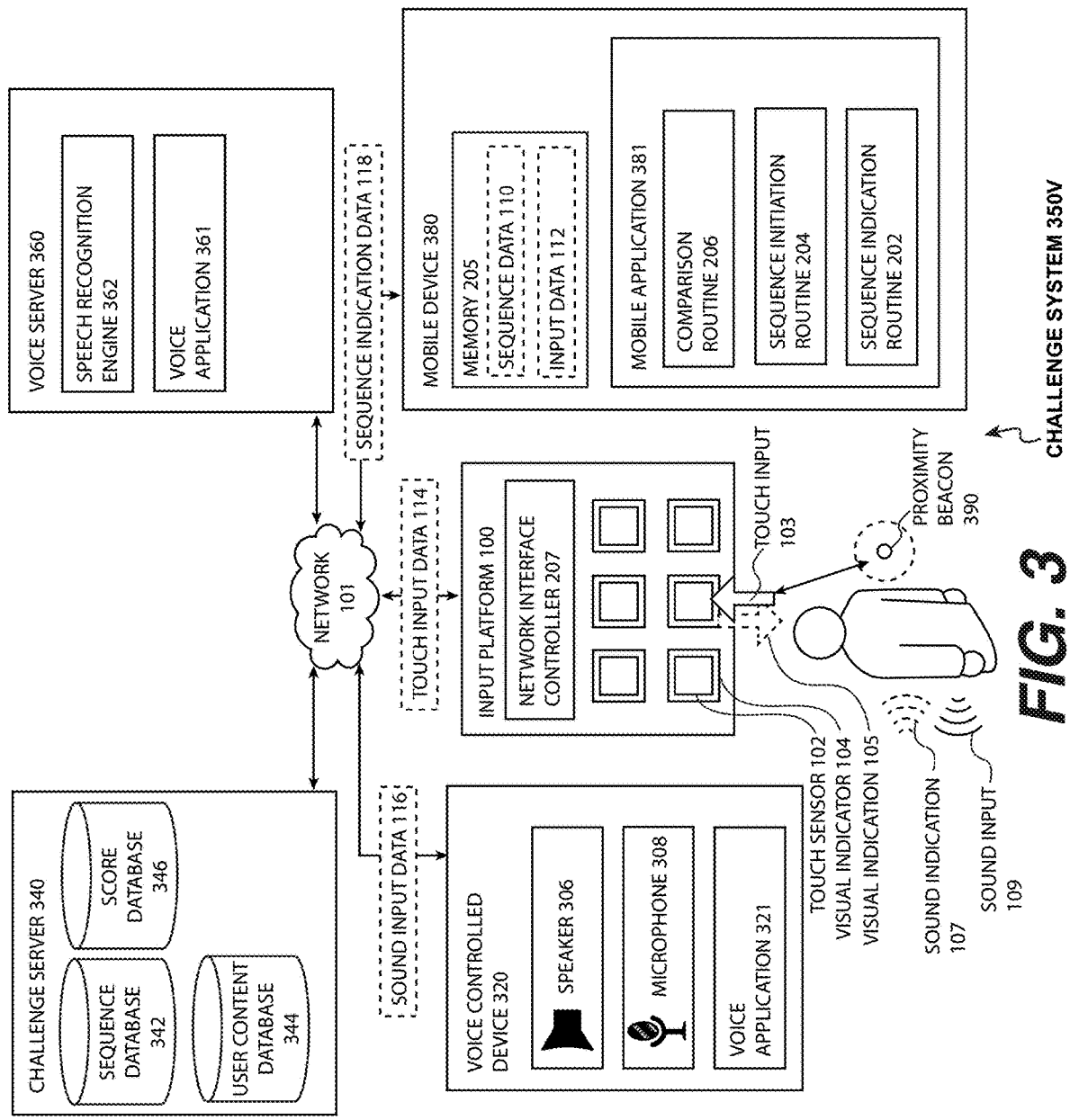
FIG. 3 illustrates a challenge system comprising the input platform and one or more additional elements such as a voice controlled device comprising a speaker and a microphone, a challenge server that may store instances of the sequence data and maintain scores and/or ranks, a voice server that may analyze the sound input of the user, a mobile device comprising a mobile application, and a network connecting each of the elements, according to one or more embodiments.

A challenge share module 210 may comprise machine readable instructions that when executed on the processor 203 uploads the sequence data 110 generated by the user 199 to the challenge server 340, as shown and described in detail in conjunction with FIG. 3. Similarly, the challenge share module 210 may receive a user sequence data over the network 101, whether received as a file or streamed.

A network interface controller 209 may be used by the processor 203 to communicate via the network 101 with any of several other devices, such as one or more instances of a challenge server 340 (e.g., an example of a server computer), one or more instances of a voice server 360 (e.g., another example of a server computer), one or more instances of voice controlled devices 320, one or more instances of mobile devices 380, and the input platform 100, as shown and described in detail in conjunction with FIG. 3.

FIG. 3 illustrates a challenge system 350 comprising the input platform 100 and one or more additional elements such as a voice controlled device 320 comprising a speaker 306 and a microphone 308, a challenge server 340 that may store instances of the sequence data 110 and maintain scores and/or ranks, a voice server 360 that may analyze the sound input data 116 of the user 199, a mobile device 380 comprising a mobile application 381, and a network 101 connecting each of the elements, according to one or more embodiments.

The embodiment of FIG. 3 illustrates a system for administering a sequence-based challenge to one or more instances of the user 199. Each element may carry out distinct or overlapping functions within the challenge system 350. The user 199 may utilize their mobile device 380 to select a sequence data 110, which may be downloaded from the challenge server 340 and may be specifically read from a sequence database 342. The mobile application 381 may comprise the sequence indication routine 202, the sequence initiation routine 204, and/or the comparison routine 206. Following selection on the mobile device 380, the sequence may be presented to the user 199 on the input platform 100 and/or the voice controlled device 320.

In the embodiment of FIG. 3, the input platform 100 comprises a network interface controller 209, six instances of the touch sensor 102, and six instances of the visual indicator 105. The voice controlled device 320 may comprise the speaker 306, the microphone 308, and a voice application 321. Upon selection of the sequence data 110, the mobile device 380 may communicate with the input platform 100 and/or the voice controlled device 320 over the network 101 to present the visual indication 105 of the visual indicator 104 of the input platform 100 and/or the sound indication 107 of the speaker 306 of the voice controlled device 320. The indications may be transmitted as the indication data 118, which may store the data specifying which instances of the visual indicator 104, and/or sound indications 107 of the speaker 106 to present to the user 199 to communicate the sequence. In one or more embodiments, the mobile device 380, the input platform 100, and the voice controlled device 320 may be in a same physical environment with the user 199 (e.g., in a room of a house in an auditorium) and connected through a WiFi router and/or a Bluetooth connection.

The user 199 may select through a user interface of the mobile application 381 that the user 199 is ready to begin recalling and inputting the sequence, which may initiate the sequence initiation routine 204. The user 199 may then provide the touch input 103 to generate the touch input data 114 and the sound input 109 to generate the sound input data 116. The touch input data 114 and the sound input data 116 may be transmitted through the network 101 to the mobile device 380 where it may be assembled and/or stored as the input data 112. The comparison routine 206 may then compare the input data 112 to the sequence data 110 to generate the score and/or the rank. However, in one or more embodiments, the sound input data 116 may first be transmitted to the voice server 360 for analysis. For example, the voice server 360 may include a speech recognition engine 262 to assist in translating a sound (e.g., a word) of the user 199 into a text and/or other data that may be utilized in the sequence data 110 and/or by the comparison routine 206. The speech recognition engine 262 may be used to assess which of two or more instances of the user 199 is speaking. In one or more embodiments, the comparison routine 206 may also transmit the input data 112 to the voice server 360 for analysis and/or to aid in scoring.

The voice controlled device 320 may be a voice controlled assistance device and/or a "smart speaker" such as an Amazon Echo®, an Amazon Echo Dot®, a Google Home®, and/or a Sonos One®. The voice controlled device 320 may be connected to a back end voice recognition engine 362 over the network 101. The input platform 700, the voice controlled device 720, and the mobile device 780, may be connected through the network 101, such as through a Bluetooth connection, through a WiFi network, over a cellular network, over a satellite network, etc.

The voice application 321 of the voice controlled device 320 may be a computer program with a processor and a memory. The voice application 321 allows the user 199 to interface with and/or provide speech commands to the voice controlled device 320.

The challenge server 340 comprises a sequence database 342, the score database 346, and/or the user content database 344. The sequence data 110 may be stored in the sequence database 342. The score database comprises a score and/or a rank of the user 199 and/or the input data 112.

In one or more embodiments, the voice controlled device 320 and/or the voice server 360 may comprise the sequence indication routine 202, the sequence initiation routine 204, the comparison routine 206, and/or additional elements of the control unit 200. In one or more embodiments, the user 199 may be able to select the sequence data 110 and engage in the challenge using solely a voice interface (e.g., via the voice controlled device 320).

In one or more embodiments, as shown in FIG. 3, the user 199 may also enter the touch input 103 through a proximity beacon 390. The proximity beacon 390 is an item the user 199 holds, wears, and/or attaches which, when touching the touch sensor 102 and/or in a close proximity to the touch sensor 102 to act as the touch input 103 to generate the touch input data 114. For example, the proximity beacon 390 may be based on a near-field communication, an RFID, and/or other methods and devices known in the art. The proximity beacon 390 may be part of a special glove or sock worn to engage in the challenge. The glove with the proximity beacon 390 may be referred to as an "input glove," and the sock with the proximity beacon 390 may be referred to as an "input sock. There may be different instance of the sock for each instance of the user 199. For example, where the input platform 100 has two players (which may according to one or more embodiments cooperatively and/or competitively engage in the challenge of the sequence data 110), a first glove may be a "player one" glove and a second glove may be for a "player two" glove. In such case the touch sensor 102 may be able to generate a distinct signal for communication to the control unit 200 depending on which instance of the glove provided the touch input 103. The input data 112 may include an additional attribute for which a player (e.g., an instance of the user 199) who entered the data is defined.

In one or more embodiments the challenge system 350 may comprise only some of the elements and devices illustrated. For example, the challenge network 350 may comprise the input platform 100, the mobile device 380, and the challenge server 340, where the mobile device 780 may comprise the control unit 200, the speaker 306, the microphone 308, and possibly even the speech recognition engine 362. In one or more embodiments, the challenge network 350 may comprise the input platform 100, the voice controlled device 320, and the voice server 360. In such case, the entire experience of the user 199 interfacing with the input platform 100 may be through a voice-controlled application (e.g., the voice application 321 and/or the voice application 361, which may be, for example, an Alexa® skill).

Figure 4:
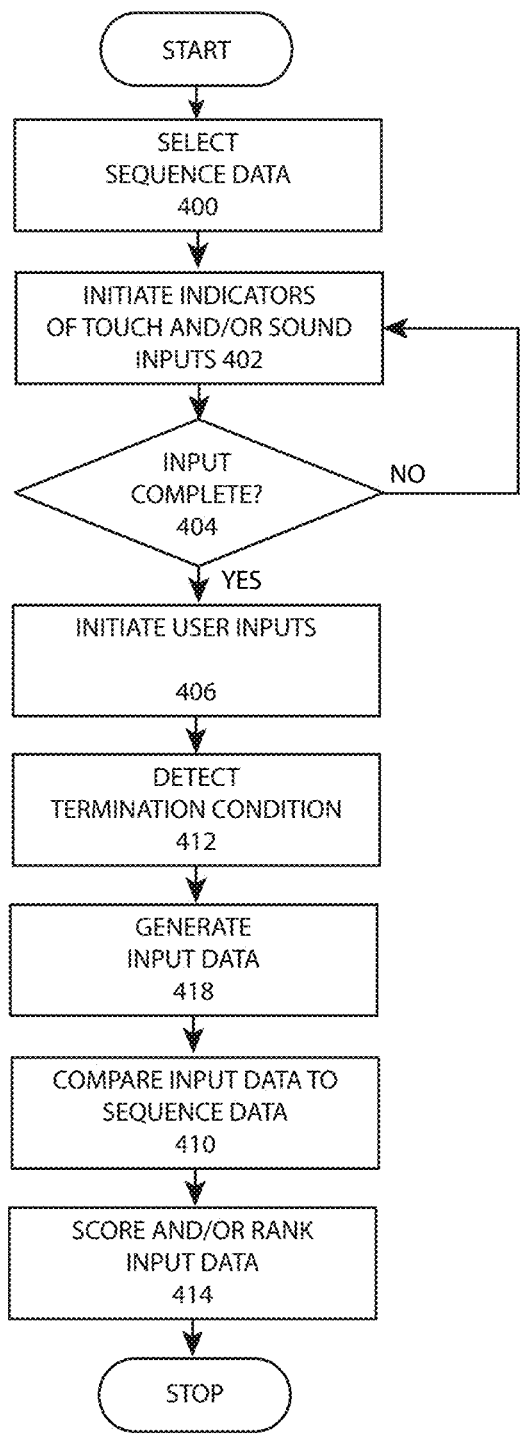
FIG. 4 illustrates a challenge process flow in which a sequence data is selected, input indicators communicated to the user, inputs of the user initiated, and/or an input data compared to generate a score and/or rank, according to one or more embodiments.

FIG. 4 illustrates a challenge process flow 450 in which a sequence data 110 is selected (e.g., by the user 199), input indicators initiated (e.g., a visual indication 105, a sound indication 107), inputs of the user 199 initiated, and/or an input data 112 compared (e.g., to the sequence data 110) to generate a score and/or rank, according to one or more embodiments. In operation 400 a sequence data 110 is selected for a challenge. The selection may be completed by one or more instances of the user 199. The selection may be a direct selection where the user 199 chooses which challenge they wish to engage in. The selection may be an indirect selection where the user 199 chooses a category of challenge and one of several instances of the challenge within the category is randomly determined. The selection may also be of a random and/or algorithmically generated challenge such that the sequence data 110 is unique and the user 199 will not have any ability to rely on their biological memory from previous challenges. In one or more embodiments, a first instance of the user 199 engaging in the challenge may have the sequence data 110 selected by a second instance of the user 199 may be present at the input platform 100 (e.g., an input platform 100A) or may be remote from the input platform 100. For example, the second instance of the user 199 may be located at a second instance of the input platform 100 (e.g., an input platform 100B) awaiting a score of the first instance of the user 100 and then to "respond" by engaging in a challenge where the first instance of the user 199 selects a second instance of the sequence data 110 to challenge the second instance of the user 199.

Operation 402 reads the sequence data 110 to initiate a visual indication 104 of a touch input 103, a visual indication 104 of a sound input 109, a sound indication 107 of a touch input 103, and/or a sound indication 107 of a sound input 109. For example, operation 402 may animate a graphic on a visual indicator 104 associated with a touch sensor 102. In another example, operation 402 may animate a graphic on a visual indicator 104 where a word is to be used as a sound input 109 for the graphic. In yet another example, operation 402 may provide a word (e.g., via the speaker 106) specifying a touch sensor 102 and/or the word may name a graphic associated with the touch sensor 102. In still another example, a word may be output (e.g., from the speaker 106) specifying a sound and/or a word that must be spoken as a sound input 109 (e.g., via the microphone 108).

Operation 404 determines whether each instance of the input indicator defined within the sequence data 110 has been indicated. For example, operation 404 may determine that a last indicator ID 214.n has been read, as shown and described in conjunction with FIG. 2. If the sequence is incomplete, operation 404 returns to operation 402. If complete, operation 404 proceeds to operation 406. In one or more embodiments, operation 400, operation 402, and/or operation 404 may be carried about by the sequence indication routine 202 of FIG. 2.

Operation 406 initiates inputs of the user 199, for example the touch input 103 and/or the sound input 109. In one or more embodiments, operation 406 initiates a listening and/or recording process in which data on one or more channels (e.g., receiving from wires to instances of the touch sensor 102, receiving from the microphone 108) in which any input on the one or more channels is stored in a computer memory (e.g., the memory 205). The data stored in operation 406 may result in the input data 112 in operation 408.

Operation 408 generates the input data 112 based on the input received in operation 406. As shown and described in conjunction with FIG. 2, the input data 112 may be written to a computer memory as one or more instances of an input entry 227. In one or more embodiments, operation 406 and/or operation 408 may be carried out by the sequence initiation routine 204.

Operation 410 compares the input data 112 to the sequence data 110. For example, operation 410 may compare a value of the sensor ID 216.1 of the sequence entry 211.1 of the sequence data 110 to a value of the sensor ID 224.1 of the input entry 227.1 of the input data 112 to determine whether there is a match. If so, operation 410 may have determined a "correct" and/or high scoring instance of the input provided by the user 199. In another example, operation 410 may compare a value of the duration 220.55 of the sequence entry 211.55 of the sequence data 110 to a value of the sensor ID 228.55 of the input entry 227.55 of the input data 112 to determine whether the value of the duration 228.55 is within a value of the tolerance 222.55 of the sequence entry 211.555. If so, operation 410 may have determined a "correct" and/or high scoring instance of the input provided by the user 199. In another example, a sound input 230.6 that includes a word of the user 199 may be analyzed by a speech recognition system (e.g., the speech recognition engine 362) and the word compared to a word specified in the sequence data 110. Where a match occurs, the user 199 may have said the "correct" and/or high scoring word. In one or more embodiments, operation 410 may compare in real time each input of the user 199 as it is stored in the input data 112. In one or more other embodiments, the entire instance of the input data 112 may be stored until termination (e.g., according to operation 412) before the input data 112 is compared in operation 410. In one or more embodiments, operation 410 may be carried out by the comparison routine 206. An example of aspects of operation 410 is shown and described in further detail in the embodiment of FIG. 5.

Operation 412 detects a termination condition 207. The termination condition 207 may be any one or many events and/or determinations. The termination condition 207 may be expiration of a timer, for example permitting thirty seconds for the user 199 to recall the sequence data 110. The termination condition 207 may be, for example, receiving a touch input 103 that is not specified within the sequence data 110, a touch input 103 that is out of sequence within the sequence data 110, and/or a time of the touch input 103 that is not within a time specified by the sequence entry 211 of the sequence data 110. In one or more embodiments, the termination condition 207 may be receiving a number of instances of the input entry 227 in the input data 112 equal to the number of instances of the sequence entry 211 in the sequence data 110. In one or more other embodiments, detection of the termination condition 207 may occur in real time for each comparison of operation 410.

Operation 414 scores and/or ranks the input data 112 of the user 199. For example, each instance of the input entry 227 may receive a score based on the sensor ID 224, the time 226, and/or the duration 228 relative to the tolerance 222 of a corresponding instance of the input entry 227. In one or more embodiments, a score may be modified (e.g., provided extra points and/or a score multiplier) based on other aspects of the input data 112, for example several "correct" inputs in a row, or completion of a particularly difficult aspect of the sequence. The score may also be compared to one or more other instances of the input data 112 (e.g., generated by another instance of the user 199) to score and/or rank the input data 112 against the one or more other instances of the input data 112. A ranking may be a local ranking (e.g., by geographical area), a global ranking, and/or a categorial ranking (e.g., by challenge level, by age, by theme, by content, etc.).

Figure 5:
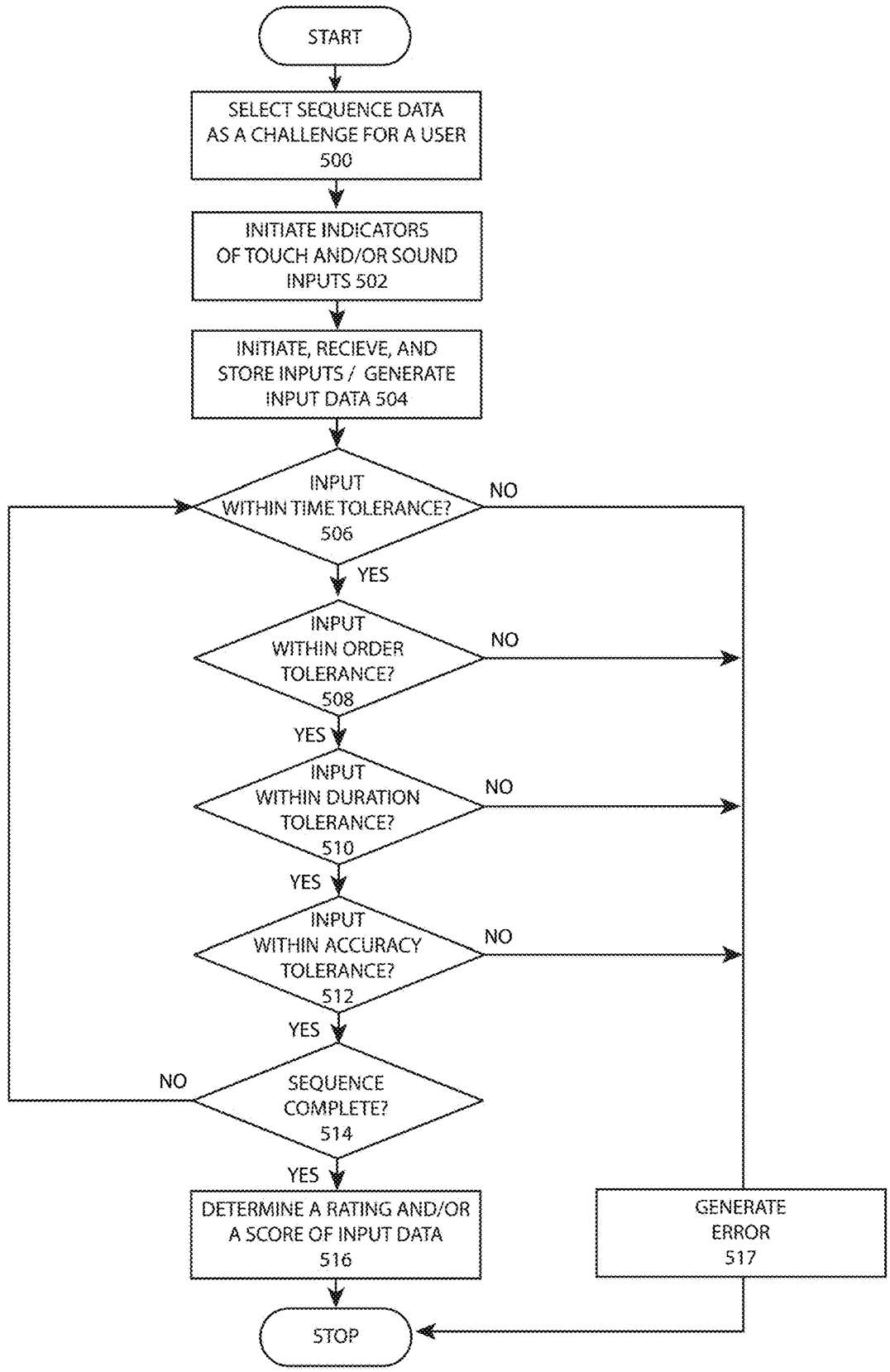
FIG. 5 illustrates an input evaluation process flow in which inputs received (e.g., the touch input, the sound input) are compared against the sequence data within a tolerance to determine a score of the input data and/or trigger a termination condition ending the challenge, according to one or more embodiments.

FIG. 5 illustrates an input evaluation process flow 550 in which inputs received (e.g., the touch input 103, the sound input 109) are compared against the sequence data 110 within a tolerance 222 to determine a score of the input data 112 and/or trigger a termination condition 207, according to one or more embodiments.

Operation 500 may operate similarly to operation 400 of FIG. 4. Operation 500 and/or operation 400) may allow for the user 199 to set a difficulty level, which may adjust the tolerance 222, reduce an indication time, add random instances of the input entry 228, etc. Operation 502 may operate similarly to operation 402 and operation 404. Operation 504 may operate similarly to operation 406 and operation 408.

Operation 506 may determine whether an input is within a time tolerance. For example, operation 506 may determine wither a difference between a value of the time 226 of the input entry 227 of the input data 112 and a value of the time 218 specified in the sequence data 110 is within a range specified in the tolerance 222. If the input is not within the tolerance, operation 222 may proceed to operation 507. Otherwise, operation 506 may proceed to operation 508. Operation 507 may generate an error that may be, for example, a message presented to the user 199 and/or other feedback. Alternatively or in addition, operation 507 may trigger the termination condition 207.

Operation 508 may determine whether the input is within an order tolerance of the sequence data 110. For example, where the sequence indicated to the user 199 was a set of the touch sensor 102: "upper right, lower left, middle, upper right.", the tolerance 222 may specify that one instance of a touch input 103 may be out of order. For example, the user 199 may enter "upper right, middle, lower left, upper right" and still be determined to be within the tolerance 222. If the input is not within the tolerance, operation 222 may proceed to operation 507. Otherwise, operation 508 may proceed to operation 510.

Operation 510 may determine whether an input is within a duration tolerance. For example, operation 510 may determine wither a difference between a value of the duration 228 of the input entry 227 of the input data 112 and a value of the duration 220 specified in the sequence data 110 is within a range specified in the tolerance 222 as a duration tolerance. For a sound input 109, the duration may specify the length of time a sound, a word or sentence is produced. If the input is not within the duration tolerance, operation 510 may proceed to operation 507. Otherwise, operation 510 may proceed to operation 512.

Operation 512 determine whether an input is within an accuracy tolerance. For example, a sound input 109 may be compared to a tone in the sequence data 110, a wavelength of which may vary as specified by a value in the tolerance 222. In one or more other embodiments, accuracy may be an overall accuracy of the input of the user 199. For example, a total percentage of instances of the sequence entry 211 outside of a tolerance 222 (e.g., based on a time, an order, and/or a duration) may not fall below eighty percent. One or more other accuracy determinations related to the input data 112 relative to the sequence data 110 may be similarly made.

Operation 514 determines whether a sequence recorded in the input data 112 is complete and/or the termination condition 207 has occurred. Where each instance of the input entry 227 of the input data 112 has been assessed, operation 514 proceeds to operation 516. If not, operation 514 returns to operation 506. Otherwise, operation 514 proceeds to operation 516. Operation 516 may operate similarly to operation 414 of FIG. 4. In one or more embodiments, a failing value of the tolerance 222 may specify a value which if exceeded directs the process flow 550 to operation 507 and one or more scoring values of the tolerance 222 which are assessed by operation 516.

FIG. 6 illustrates an embodiment of the input platform 100 (e.g., embodied as the input platform 650) comprising a mat 601, a housing 603 including a speaker 606 and a microphone 608, instances of a light 604 as the visual indicator 104, and instances of the pressure plate 602 as the touch sensor 102, according to one or more embodiments. In the embodiment of FIG. 6, the input platform 650 comprises the mat 601 can lay substantially flat surface such as a floor, wall, table, or other surface. The mat 601 may be flexible and able to roll up and/or retract into the housing 603. The mat 601 may be ridged. The mat 601 may be made of, for example, a rubber, a plastic, and/or a cloth. A wire may connect each instance of the light 704 and the touch sensor 702 to the control unit 200 which may be contained in the housing 703 and/or they may share a data b. The light 704 may be implemented with an LED light. In one or more alternate embodiments, the light 704 may be an LCD screen. The input platform 600 may be powered by a power supply that may be, for example, a battery and/or a wall outlet with a power converter.

The user 199 may have a sequence indicated to the user 199 on instances of the light 604 as the visual indicator 104 and/or through the speaker 606 as instances of the sound indicator 109. The user 199 may use a hand, a gloved hand, a foot, a "socked" foot, and/or other body parts such as foreheads, knees, and elbows to provide the touch input 103 on one or more instances of the pressure plate 602. In one or more embodiments the user 199 may use an a proximity sensor 390 attached to an extremity of the user such as an arm, a leg, a hand, and/or a foot. Each instance of the pressure plate 602 has an associated instance of the light 604. The user 199 may speak or make additional sounds collected by the microphone 608 to provide the sound input 109. The user 199 may select the sequence data 110 through a user interface of buttons and/or a screen in the housing (not shown), through one or more instances of the pressure plate 602, and/or through other means including coordination over a network (e.g., the network 101) with a mobile device, as shown in conjunction with FIG. 3 and FIG. 7.

Figure 7:
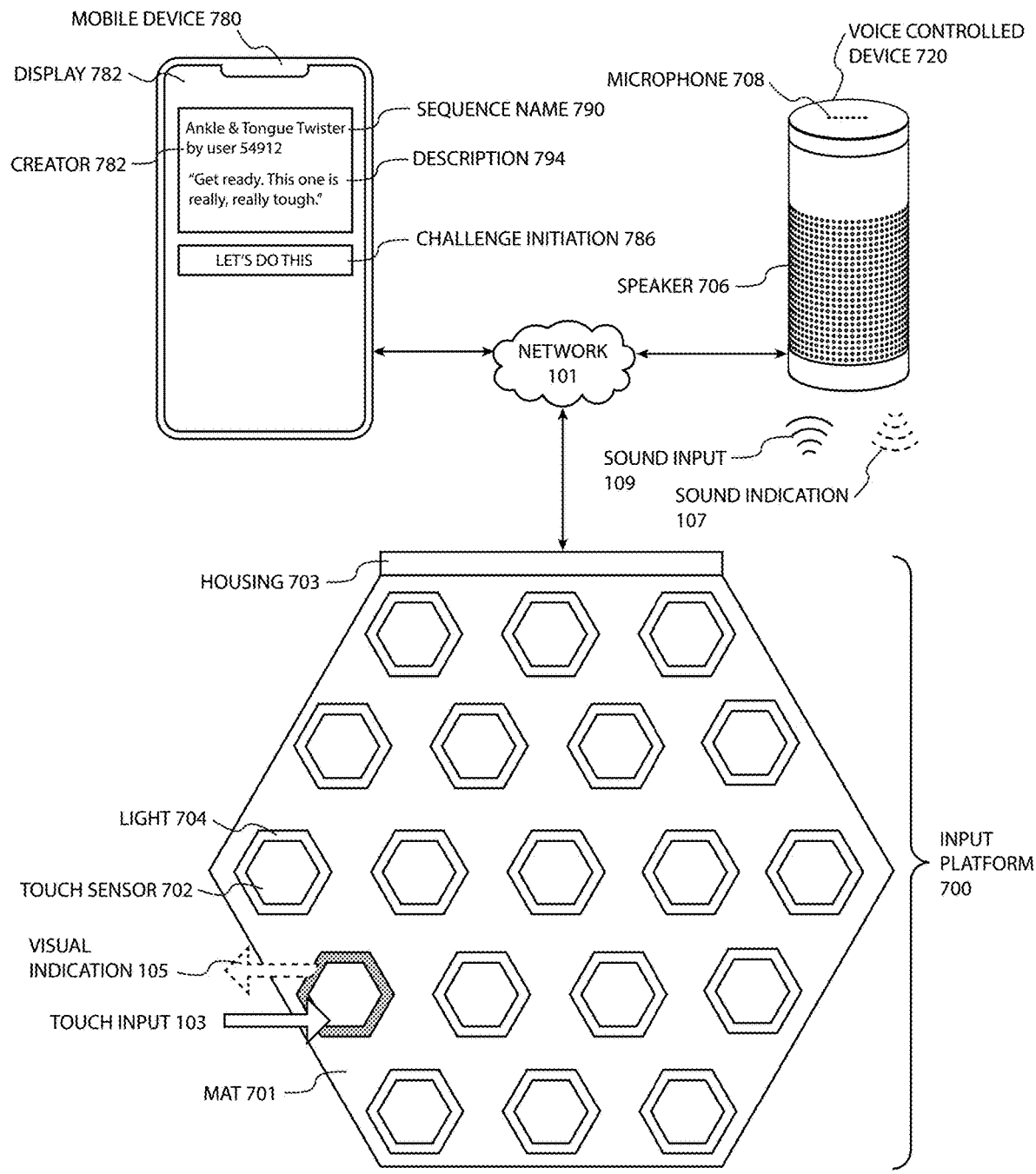
FIG. 7 illustrates a challenge system comprising an input platform having nineteen instances of the light and nineteen instances of a touch sensor, a mobile device for selecting the sequence data and administering the challenge, and a voice controlled device for providing sound indicators to the user and receiving and/or parsing sound inputs of the user, according to one or more embodiments.

FIG. 7 illustrates a challenge system 750 comprising an input platform 100 (embodied as the input platform 700) having nineteen instances of the light 704 and nineteen instances of a touch sensor 702, a mobile device 780 for selecting the sequence data 110 and administering the challenge, and a voice controlled device 720 for providing instances of the sound indication 107 to the user 199 and receiving and/or parsing instances of the sound input 109 of the user 199, according to one or more embodiments. In the embodiment of FIG. 7, the control unit 200 may be included in a mobile application of the mobile device 780. The mat 701 may be made of a ridged material (e.g., the mobile application 381 of FIG. 3).

The user 199 may select on a user interface presented on a display 782 of the mobile device 780 a sequence data 110 for download. As shown, the user 199 may select a sequence data 110 generated by a different user 199 (e.g., as a user sequence data) that may have a sequence name ("Ankle & Tongue Twister"), a creator (e.g., "user 54912"), and a description ("Get ready. This one is really, really tough"). The user interface may also have a challenge initiation 796 button for selecting and initiating the challenge. The user sequence data may have been defined on a mobile device of "user 54912", for example by selecting a pattern and words for inputs of the sequence from a digital model of the input platform 100 and/or from dropdown menus and other software tools.

The voice controlled device 720 may be a voice controlled assistance device and/or a "smart speaker" such as an Amazon Echo®, an Amazon Echo Dot®, a Google Home®, and/or a Sonos One®. The voice controlled device 720 may be connected to a back end voice recognition service over the network 101, for example the voice server 360 as shown and described in conjunction with FIG. 3. The input platform 700, the voice controlled device 720, and the mobile device 780, may be connected through the network 101, such as through a Bluetooth connection, through a WiFi network, over a cellular network, and/or over a satellite network, etc.

An example embodiment will now be described. A first instance of the user 199 (e.g., the user 199A) may have a first instance of the input platform 100 (e.g., the input platform 100A). A second instance of the user 199 (e.g., the user 199B) may have a second instance of an input platform 100 (e.g., the input platform 100B). The input platform 110A and the input platform 100B may be communicatively coupled through the network 101. The user 199A may select an instance of the sequence data 100A. The sequence data 100A may be communicated to the control unit 200A of the input platform 100A and substantially simultaneously to the control unit 200B of the input platform 100B. A countdown timer may begin (e.g., 10 seconds) in which the sequence data 110A will be indicated on the input platform 100A and on the input platform 100B. Following the indication, another countdown time may begin (e.g., 5 seconds), the expiration of which initiates receiving the inputs. The input platform 100A may generate a first instance of the input data 112 (e.g., the input data 112A) and the input platform 100B may generate a second instance of the input data 112 (e.g., the input data 112B). A score may be determined for the input data 112A and a score may be determined for the input data 112B based on an accuracy, timing, duration, tolerance and/or other aspects of inputs of the user 199A and the user 199B, respectively. The user 199A and the user 199B may then be presented with a score and/or a rank (e.g., a rank of both users on a ladder, a rank of each instance of the user 199 relative to the other such as "winner" and "loser", or "first place" and "second place"). In one or more other embodiments, the user 199A may generate a user generated instance of the sequence data 110A (e.g., the user sequence data), and the user 199B may be challenged to the sequence data 110A and then "respond" by generating a sequence data 110B transmitted to the user 199A. Such a challenge may occur in real time across the network 101. In one or more embodiments, a challenge of one or more instances of the user 199 may also be initiated within a time period at the discretion of the user 199. For example, a global challenge may be available to thousands of instance of the user 199 for one week, where each instance of the user 199 has an opportunity to engage in one or more attempts to achieve a high score and/or a high rank. In one or more other embodiments, the user 199A and the user 199B may cooperatively engage in a challenge where each must recall and/or input certain aspects and/or section of the sequence data 110 to receive a collective score and/or a collective rank.

In another example, a user 199C and a user 199D may engage in a challenge competitively and/or cooperatively on a single instance of the input platform 100, e.g., in a same physical space. The user 199C may select a sequence data 110 that both the user 199C and the user 199D are challenged to recall and input in turn. Alternatively, the user 199C and the user 199D may engage in a cooperative challenge in which one or more of the inputs are required to be input by the user 199C to be "correct" and/or achieve a high score, and one or more of the inputs are required to be input by the user 199D to be "correct" and/or achieve a high score. The control unit 200 may store data specifying which instance of the user 199 entered the input through a variety of means, including but not limited to: designating certain instances of the touch sensor 102 for the user 100C and other instances of the touch sensor 102 for the user 100D; performing voice recognition on a sound input spoken by the user 199C and the user 199D; requiring the user 199C and the user 199D to each say their name before providing a input; and detecting a first instance of a proximity sensor 390 associated with the user 199C and a second instance of the proximity sensor 390 associated with the user 199D. For example, the user 199C may put on a glove detectable as "player one" and the second user may put on a glove detectable as "player two".

In another specific example, the input platform 100 may be implemented on a display screen with a touch sensing capability (e.g., an LCD screen that is touch sensitive). For example, the touch sensor 102 may be an area of the display defined to generate the touch input data 116 when pressed by the user 199. The area may also change color and/or produce animation when providing the visual indication 105, where the area for the touch sensor 102 and the area for the visual indicator 104 are partially or completely co-extensive. In one or more embodiments, a location of the touch sensor 702 may change according to a pattern and/or randomly to increase difficulty of the challenge.

An example of a physical aspect of the challenge will now be provided. In one or more embodiments the platform 100 is sufficiently large such that an average adult can reach any two instance of the touch sensor 102. The user 199 may not only be required to recall the sequence, but also to generate inputs in difficult-to-reach locations to provide a physical challenge. For example, for a first input the user 199 may have to activate and hold a first touch input 102A (e.g., an input with a long duration), and while holding, activate another instance of the touch input 102B that on the other side of the input platform 100. The user 199 may have to activate certain instances of the touch input 102 with a first extremity and other instances with a second extremity (e.g., a hand and a foot). The user 199 may have to respond quickly when a certain event occurs, which may test a flexibility and/or dexterity of the user 199. For example, where the user 199 is recalling a sequence and a visual indicator 103 flashes red and/or a sound comes from the speaker 106, the user 199 may have to activate a certain instance of the touch input 102 and/or avoid other instances of the touch input 102.

Another example of a challenge will now be provided. The input platform 100 may include fifty instances of the visual indicator 104 that each are a shape of a nation of the world. The sequence data 110 may comprise data specifying one or more nations of the world. The user 199 may be presented with the sequence data 110 as a sound indication 107 that provides one or more of the countries that the user 199 must remember. The user 199 may then recall the sequence presented as the sound indication 107 by providing a touch input 103 for each touch sensor 102 corresponding to the nation. For example, the sound indication 107 may be "United States, Ukraine, Russia, South Africa". After a pause or another indication, the user 199 may then be required to provide four instances of a touch input 103 on the input platform 100 to four instances of the touch sensor 102 that correspond to, respectively, United States, Ukraine, Russia, and South Africa. The user 199 may additionally be tested on a pronunciation of each nation, and/or may be provided nations that are difficult to pronounce in succession to provide a verbal challenge.

Although the present embodiments have been described with reference to specific example embodiments, it will be evident that various modifications and changes may be made to these embodiments without departing from the broader spirit and scope of the various embodiments. For example, the various devices, engines, algorithms, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application-specific integrated circuitry (ASIC) and/or Digital Signal Processor (DSP) circuitry). For example, each processor and memory may be implemented as one or more processing units (e.g., processing cores) and/or one or more memory units, respectively.

In addition, it will be appreciated that the various operations, processes, and methods disclosed herein may be embodied in a non-transitory machine-readable medium and/or a machine-accessible medium compatible with a data processing system (e.g., the input platform 100, the control unit 200, the voice controlled device 320, the challenge server 340, the voice server 360, the mobile device 380, etc.). Accordingly, the specification and drawings are to be regarded in an illustrative rather than a restrictive sense.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. A system for engaging a user in a mental and/or physical challenge, the system comprising:
    an input platform comprising:
        a platform,
        two or more touch sensors attached to the platform for receiving a touch input from the user,
        two or more visual indicators at least one of attached to and attachable to the platform, at least one of the two or more visual indicators associated with at least one of the two or more touch sensors,
        a processor of the input platform,
        a computer memory of the input platform,
        a network interface controller of the input platform, and
    a mobile device comprising:
        a display,
        a processor of the mobile device,
        a computer memory of the mobile device, comprising:
            a sequence data comprising data specifying at least one of an order of an input, a timing of the input, and a duration of the input;
            a sequence indication routine comprising computer readable instructions that when executed at least one of generate an input indication of at least a portion of the sequence data on the display of the mobile device and transmits a sequence indication data to the input platform to generate the input indication to the user on at least one of the two or more visual indicators of the input platform,
            a sequence initiation routine comprising computer readable instructions that when executed generates an input data comprising a touch input data received from one or more of the two or more touch sensors of the input platform,
            a comparison routine comprising computer readable instructions that when executed compares the sequence data to the input data to determine a match, and
            a termination condition comprising data specifying one or more conditions under which the comparison routine terminates, and
        a challenge server comprising:
            a processor of the challenge server,
            a sequence database comprising the sequence data,
            a score database, and
            a memory of the challenge server comprising computer readable instructions that when executed on the processor of the challenge server:
                transmit the sequence data to the mobile device; and
                receive at least one of a score and rating based on the match determined by the comparison of the sequence data to the input data, and a voice controlled device, comprising:
  a processor of the voice controlled device,
  a network interface controller of the voice controlled device,
  a speaker,
  a microphone,
  a memory of the voice controlled device comprising computer readable instructions that when executed on the processor of the voice controlled device:
    generate a sound input data, where the sound input data further comprises a sound input received from the microphone; and
    transmit the sound input data to the mobile device, wherein the input data further comprises the sound input data, and
  a voice server comprising:
    a processor of the voice server,
    a memory of the voice server comprising computer readable instructions that when executed on the processor of the voice server:
      receive the sound input from the voice controlled device, and
    a speech recognition engine comprising computer readable instructions that when executed on the processor of the voice server determine a word from the sound input received from the voice controlled device, and
a network communicatively coupling the input platform, the mobile device, the voice controlled device, the voice server, and the challenge server.

2. The system of claim 1, wherein the mobile device further comprising:
  a sequence creation routine comprising computer readable instructions that when executed on the processor of the mobile device at least one of records a user sequence data that is an instance of the sequence data based on the input data of the user, and
  a share module for at least one of uploading the user sequence data to at least one of a server computer and a computing device of a different user.

3. The system of claim 2, wherein the challenge server further comprising:
  a user content database comprising the user sequence data.

4. The system of claim 3, further comprising:
  a proximity beacon attachable to the user and communicatively coupled to the touch input of the input platform.

5. The system of claim 4, wherein the sequence initiation routine further comprising computer readable instructions that when executed:
  generate a visual indication of the touch input, and
  generate a sound indication of the sound input,
    wherein at least one of the two or more visual indicators is a light at least one of within at least one of the two or more the touch sensors and proximately associated with the at least one of the two or more touch sensors, and the computer memory of the mobile device further comprising computer readable instructions that when executed illuminate the light,
    wherein the proximity beacon attachable to an extremity of the user is at least one of an input glove and an input sock,
    wherein the input data is associated with the score based on at least one of the order of the input, the timing of the input, and the duration of the input,
    wherein at least one of the order, the timing, and the duration is set to a music,
    wherein the sequence data receivable over at least one of the network interface controller of the mobile device and the network interface controller of the voice controlled device, and
    wherein the sound indication is the word.

6. A system for engaging a user in a mental and/or physical challenge, the system comprising:
  an input platform comprising:
    a platform,
    two or more touch sensors attached to the platform for receiving a touch input from the user,
    two or more visual indicators at least one of attached to and attachable to the platform, at least one of the two or more visual indicators associated with at least one of the two or more touch sensors,
    a processor of the input platform,
    a computer memory of the input platform,
    a network interface controller of the input platform, and
  a voice controlled device comprising:
    a speaker
    a microphone
    a processor of the voice controlled device,
    a computer memory of the voice controlled device storing a voice application, the voice application comprising:
      a sequence data comprising data specifying at least one of an order of an input, a timing of the input, and a duration of the input;
      a sequence indication routine comprising computer readable instructions that when executed on the processor of the voice controlled device at least one of generate an input indication of at least a portion of the sequence data on the speaker of the voice controlled device and transmit a sequence indication data to the input platform to generate the input indication to the user on at least one of the two or more visual indicators of the input platform,
      a sequence initiation routine comprising computer readable instructions that when executed on the processor of the voice controlled device generate an input data comprising a touch input data received from one or more of the two or more touch sensors of the input platform,
      a comparison routine comprising computer readable instructions that when executed on the processor of the voice controlled device compare the sequence data to the input data to determine a match, and
  a voice server comprising:
    a processor of the voice server,
    a memory of the voice server comprising computer readable instructions that when executed on the processor of the voice server:
      receive a sound input from the voice controlled device, and
    a speech recognition engine comprising computer readable instructions that when executed on the processor of the voice server determine a word from the sound input received from the voice controlled device,
      wherein the voice controlled device further comprises a network interface controller of the voice controlled device, and
a network communicatively coupling the input platform, the voice controlled device, and the voice server.

7. The system of claim 6, further comprising:
the voice controlled device further comprising:
- a sequence creation routine comprising computer readable instructions that when executed on the processor of the voice controlled device at least one of records a user sequence data that is an instance of the sequence data based on the input data of the user.

8. The system of claim 7, further comprising:
a challenge server comprising:
- a processor of the challenge server,
- a sequence database comprising the sequence data,
- a score database, and
- a memory of the challenge server comprising computer readable instructions that when executed on the processor of the challenge server:
  - transmit the sequence data to the voice controlled device; and
  - receive at least one of a score and rating based on the match determined by the comparison of the sequence data to the input data, and
- a proximity beacon attachable to the user and communicatively coupled to the touch input of the input platform.

9. The system of claim 8, further comprising:
the voice controlled device further comprising:
- a share module for at least one of uploading the user sequence data to at least one of a server computer and a computing device of a different user.

10. The system of claim 9, further comprising:
the challenge server further comprising:
- a user content database comprising the user sequence data, and
the sequence initiation routine further comprising computer readable instructions that when executed:
- generate a visual indication of the touch input; and
- generate a sound indication of the sound input.

11. The system of claim 10,
wherein at least one of the two or more visual indicators is a light at least one of within at least one of the two or more the touch sensors and proximately associated with the at least one of the two or more touch sensors, and the computer memory of the voice controlled device further comprising computer readable instructions that when executed on the processor of the voice controlled device illuminate the light,
wherein the proximity beacon attachable to an extremity of the user is at least one of an input glove and an input sock,
wherein the input data is associated with the score based on at least one of the order of the input, the timing of the input, and the duration of the input,
wherein at least one of the order, the timing, and the duration is set to a music,
wherein the sequence data receivable over at least one of the network interface controller of the voice controlled device and the network interface controller of the voice controlled device, and
wherein the sound indication is the word.

* * * * *